United States Patent
Jung et al.

(10) Patent No.: US 9,043,017 B2
(45) Date of Patent: May 26, 2015

(54) HOME NETWORK SYSTEM AND METHOD FOR AN AUTONOMOUS MOBILE ROBOT TO TRAVEL SHORTEST PATH

(75) Inventors: Hee-Won Jung, Suwon-si (KR); Jong-Hee Kim, Seongnam-si (KR); Seung-Gun Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 724 days.

(21) Appl. No.: 11/716,336

(22) Filed: Mar. 9, 2007

(65) Prior Publication Data

US 2007/0219667 A1 Sep. 20, 2007

(30) Foreign Application Priority Data

Mar. 15, 2006 (KR) .................................. 2006-23769

(51) Int. Cl.
*G06F 19/00* (2011.01)
*G05D 1/02* (2006.01)
*H04L 12/28* (2006.01)
*H04L 29/08* (2006.01)

(52) U.S. Cl.
CPC .............. *G05D 1/028* (2013.01); *G05D 1/0217* (2013.01); *G05D 1/0274* (2013.01); *H04L 12/282* (2013.01); *H04L 67/125* (2013.01); *H04L 67/12* (2013.01); *Y10S 901/14* (2013.01); *Y10S 901/46* (2013.01)

(58) Field of Classification Search
CPC ............. H04B 10/116; H04B 10/1143; H04B 10/541; G05D 1/0242; G05D 1/0255; G05D 1/0272
USPC ............... 700/245, 258, 259, 261; 901/14, 46
See application file for complete search history.

(56) References Cited

U.S. PATENT DOCUMENTS

| 2002/0011813 A1* | 1/2002 | Koselka et al. ............... 318/445 |
| 2004/0032363 A1* | 2/2004 | Schantz et al. ............... 342/127 |
| 2004/0093219 A1* | 5/2004 | Shin et al. ..................... 704/275 |

(Continued)

FOREIGN PATENT DOCUMENTS

| JP | 2002-085305 | 3/2002 |
| KR | 1020050024840 | 3/2005 |

OTHER PUBLICATIONS

Beetz et al., Integrated, Plan-Based Control of Autonomous Robots in Human Environments, IEEE Intelligent Systems, IEEE vol. 16, Issue 5, Sep.-Oct. 2001.
Reich et al., Toward Automatic Reconfiguration of Robot-Sensor Networks for Urban Search and Rescue, Association for Computing Machinery, Mar. 6, 2006.

*Primary Examiner* — Redhwan k Mawari
*Assistant Examiner* — Rodney P King
(74) *Attorney, Agent, or Firm* — The Farrell Law Firm, P.C.

(57) ABSTRACT

Provided are a home network system and a method for an autonomous mobile robot to travel along a shortest travel route. The home network system capable of home automation includes a plurality of beacons for sensing a user located in a cell coverage area and for transmitting resulting sensing information of the user; an autonomous mobile robot for executing travel to reach the user based on provided travel route information; and a home server for calculating a travel route along which the autonomous mobile robot can easily reach the user based on the sensing information of the user transmitted from the beacons, and for providing the travel route to the autonomous mobile robot. Therefore, the autonomous mobile robot may reach the user by the shortest travel route and thus reducing energy loss.

14 Claims, 6 Drawing Sheets

(56) References Cited

U.S. PATENT DOCUMENTS

| | | |
|---|---|---|
| 2004/0110544 A1* | 6/2004 | Oyagi et al. ............... 455/575.1 |
| 2005/0184907 A1* | 8/2005 | Hall et al. ..................... 342/387 |
| 2005/0216124 A1* | 9/2005 | Suzuki .......................... 700/253 |
| 2006/0111811 A1* | 5/2006 | Okamoto et al. ............. 700/214 |
| 2007/0061041 A1* | 3/2007 | Zweig ........................... 700/245 |
| 2007/0061266 A1* | 3/2007 | Moore et al. .................... 705/51 |
| 2007/0192910 A1* | 8/2007 | Vu et al. ......................... 901/17 |

* cited by examiner

HOME NETWORK SYSTEM AND METHOD FOR AN AUTONOMOUS MOBILE ROBOT TO TRAVEL SHORTEST PATH

PRIORITY

This application claims priority to an application entitled "HOME NETWORK SYSTEM AND METHOD FOR AUTONOMOUS MOBILE ROBOT TO MOVE SHORTEST PATH" filed in the Korean Intellectual Property Office on Mar. 15, 2006 and assigned Serial No. 2006-0023769, the contents of which are incorporated herein by reference.

BACKGROUND OF THE INVENTION

1. Field of the Invention

The present invention relates generally to an autonomous mobile robot, and in particular, to a home network system and method for an autonomous mobile robot to travel along the shortest travel route to a destination where a user is located and perform a corresponding operation set according to a user's instructions.

2. Description of the Prior Art

Generally, an autonomous mobile robot has power and a sensor mounted in a body and thus is capable of traveling autonomously without a signal and power supply from the external environment. The autonomous mobile robot is embedded with map information on a predetermined space for the autonomous travel in the predetermined space, the autonomous mobile robot finds its current location, sets a travel route to the destination, and moves to the set destination while avoiding obstacles sensed through the sensor.

Autonomous mobile robots have been developed as cleaner robots for cleaning an indoor space and as security robots for guarding an indoor space of a house from an external invader.

Typically, a conventional autonomous mobile robot comprises a traveling unit for incorporating movement of a body, a sensor units for sensing obstacles during moving, a controller for calculating and controlling a travel route of the autonomous mobile robot using data from the traveling unit and the sensor unit, and a power supply unit for charging and supplying power.

There are various types of traveling unit including a wheel type using a plurality of wheels rotated by a servomotor or a stepping motor, a caterpillar type using a caterpillar, or a joint type using a plurality of legs. However, generally a wheel type traveling unit is applied because it is controlled in a simple manner.

The sensor unit senses obstacles such as walls using an ultrasonic sensor or a laser sensor, and provides a resultant signal to the controller. A sensor applied to the sensor unit is typically installed at the front of the mobile robot for sensing obstacles in the traveling direction.

The controller has a microprocessor and a memory, and controls the general operation of the autonomous mobile robot, it transmits a movement command to the traveling unit, and controls the operation of the traveling unit to avoid the obstacles by a program mounted in the autonomous mobile robot according to a sensing signal provided from the sensor unit.

The power supply unit charges and provides power required for driving, operation and movement of the autonomous mobile robot, and enables the autonomous mobile robot to operate for a predetermined time duration according to the charge amount without the use of external power supply.

Generally, the movement to the destination by the autonomous mobile robot is made such that beacons are installed at fixed locations in the travel route and emit signals, and the autonomous mobile robot finds the location of the beacons using the intensity of received signals from the beacons, infers the beacon's location, and induces the movement of the mobile robot to the destination.

Figure 1:
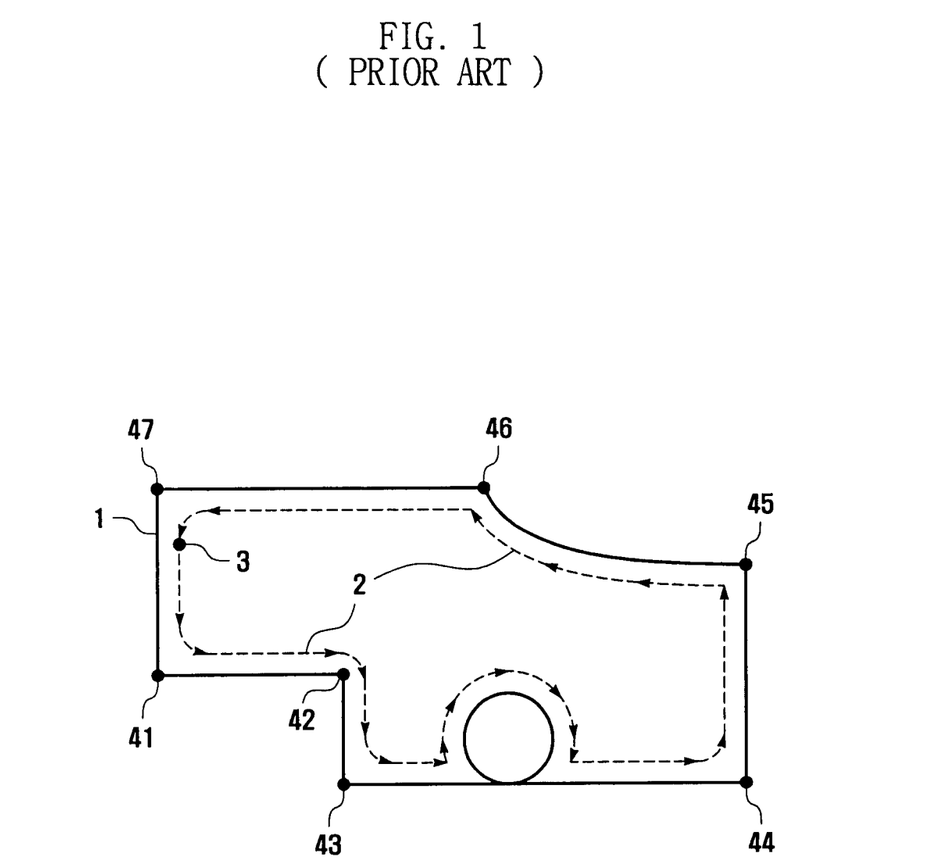
FIG. 1 is a view illustrating travel route mapping in a multiple-sided space of a conventional autonomous mobile robot using beacons.

FIG. 1 is a view of a travel route mapping in a multi-sided space of a conventional autonomous mobile robot using beacons.

As illustrated in FIG. 1, the autonomous mobile robot starts at a starting point 3 in a room having a space 1 in which obstacles exist, travels while avoiding the obstacles by an obstacle recognizing sensor, and generates a route trace by an odometer.

At this time, the autonomous mobile robot receives signals from beacons 41 to 47 installed at specific points while moving around the indoor environment, and thereby obtains additional information of the indoor space.

Thereby, the autonomous mobile robot finds its relative location based on the route trace by the odometer and beacon signals received from the beacons 41 to 47, and thus maps a travel route 2 of the multi-sided space 1. That is, the autonomous mobile robot moves to the corresponding destination depending on the beacon signals received from the beacons 41 to 47. Although this is the shortest distance along which the autonomous mobile robot may travel to the corresponding destination, the travel route 2 disadvantageously involves unnecessary movement.

As an alternative movement method of the autonomous mobile robot, the autonomous mobile robot has a camera, and the autonomous mobile robot may process an image taken through the camera, find its location and thus map the travel route.

Figure 2:
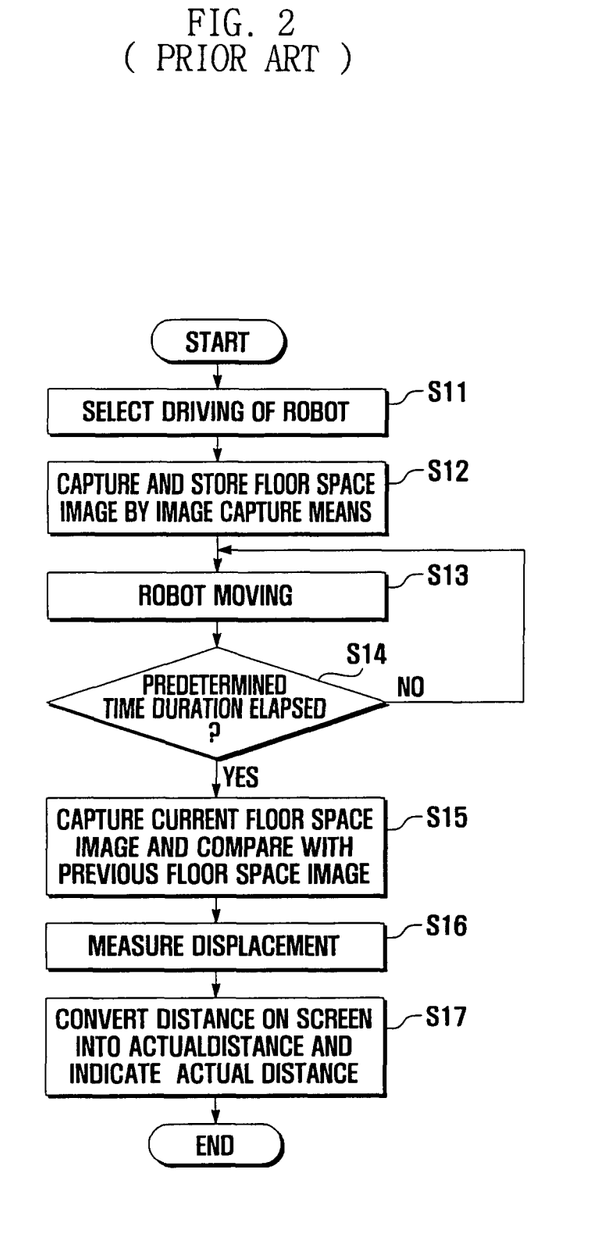
FIG. 2 is a flowchart illustrating a method for measuring the travel route of a conventional autonomous mobile robot using an image sensor

FIG. 2 is a flowchart illustrating a method for measuring the travel route of a conventional autonomous mobile robot using an image sensor.

As illustrated in FIG. 2, in step S11 when driving is selected, the autonomous mobile robot captures and stores images of the current floor space in step S12. In step S13, the autonomous mobile robot captures images while traveling around the floor and determines whether a predetermined time duration has elapsed in step S14. If a predetermined time duration has elapsed, the autonomous mobile robot captures an image of the floor space at the time, and in step S15 compares the image with the previous image.

The autonomous mobile robot measures the displacement of the image based on the image comparison result in step S16. Subsequently, in step S17 the autonomous mobile robot converts the distance of the measured image displacement to the actual distance and indicates the actual distance.

Simply, when the autonomous mobile robot moves, the autonomous mobile robot captures images of the floor space at a predetermined time interval, compares the current image with the previous image, measures the displacement between the two images, converts the measured displacement to the actual, distance, and evaluates its actual travel distance. This method is simply limited to obstacle identification and travel distance calculation by movement of the autonomous mobile robot, but the method does not take a more effective shortest travel distance to the destination into consideration.

Recently, the autonomous mobile robot has been applied to a home automation system, and thus the autonomous mobile robot is developed to execute a specific function (e.g., cleaning or security). Further, the autonomous mobile robot is connected to a home server that manages and controls a home network system in the home and which is developed to execute various functions. Further still, the autonomous mobile robot is developed to an artificial intelligence robot that may provide required results corresponding to circumstances of a user through interactivity with the user or a mobile terminal of the user.

Therefore, the autonomous mobile robot should be located sufficiently near the user such that the user can demand necessary operations to the autonomous mobile robot in a dialogic manner. Thus, the autonomous mobile robot should find the location of the user and travel to a target point where the user is located. Conventionally, however, a technique for finding the location of the user and traveling the shortest distance to the location where the user is located, is not suggested for the autonomous mobile robot.

SUMMARY OF THE INVENTION

The exemplary embodiments of the present invention is made to solve the above problems, and therefore an aspect of the present invention is to provide an autonomous mobile robot that may detect a target spot where a user is located in a home, move quickly along the shortest travel route to the target spot, reach the user and be provided with a necessary demand from the user; and a home network system and method to which the autonomous mobile robot is applied.

It is another aspect of the present invention to provide an autonomous mobile robot that finds the location of a user or robot's location using beacons in the home and reaches the user by the travel route having the shortest distance, and a home network system and method to which the autonomous mobile robot is applied.

According to an exemplary embodiment of the present invention, the above-mentioned and other aspects are achieved by a home network system capable of home automation including a plurality of beacons for sensing a user located in a cell coverage area and for transmitting resulting sensing information of the user; an autonomous mobile robot for executing travel to reach the user based on provided travel route information; and a home server for calculating a travel route along which the autonomous mobile robot can easily reach the user based on the sensing information of the user transmitted from the beacons, and for providing the travel route to the autonomous mobile robot.

Preferably, the beacon includes a sensor unit for sensing the user or a communication apparatus of the user located in the cell coverage area; a communication unit for executing communication to transmit the sensing information of the user to the home server; and a controller for controlling the communication unit to execute communication with the communication apparatus sensed by the sensor unit and to transmit information of the user to the home server.

Preferably, the beacon further includes a first storage unit for storing location information of the beacons; and a second storage unit for storing location information of the user sensed by the sensor unit.

Preferably, the beacons are uniformly arranged over the whole area in the home or are attached to electronic apparatuses in the home.

Preferably, the home server includes a communication unit for obtaining the location information of the user through communication with the beacons and transmitting the travel route information to the autonomous mobile robot; a travel route calculating unit for calculating the travel route along which the autonomous mobile robot reaches the user based on the location information of the user; and a controller for transmitting the calculated travel route information to the autonomous mobile robot through the communication unit.

Preferably, the travel route calculating unit calculates the shortest travel route along which the autonomous mobile robot reaches the user.

Preferably, the home server further includes a travel route storage unit for storing the travel route information calculated by the travel route calculating unit.

Preferably, the home server further includes a map information storage unit for storing map information of the home; a beacon location information storage unit for storing location information of the beacons installed in the home; a user location information storage unit for storing the location information of the user transmitted from the beacons; and a mobile robot location information storage unit for location information of the autonomous mobile robot.

Preferably, the autonomous mobile robot includes a power supply unit for providing power for the autonomous mobile robot to move independently; a communication unit for executing communication with the home server to receive the travel route information; a traveling unit for executing travel based on the travel route information; a sensor unit for sensing obstacles during travel of the traveling unit; and a controller for controlling travel of the traveling unit based on the travel route information and, if obstacles are sensed by the sensor unit, for controlling the traveling unit to avoid the obstacles and reach the user.

Preferably, the autonomous mobile robot further includes a map information storage unit for storing map information of the home; a beacon location information storage unit for storing location information of the beacons installed in the home; a user location information storage unit for storing the location information of the user transmitted from the home server; and a travel route storage unit for storing the travel route information transmitted from the home server.

According to an exemplary embodiment of the present invention, the above-mentioned and other objects are achieved by a method for an autonomous mobile robot to travel along a travel route using a home network system including beacons, an autonomous mobile robot and a home server, including sensing, by the beacons, a user located in a cell coverage area and transmitting resulting sensing information of the user; calculating, by the home server, a travel route along which the autonomous mobile robot can easily reach the user based on the sensing information of the user transmitted from the beacons, and providing the travel route to the autonomous mobile robot; and executing, by the autonomous mobile robot, travel to reach the user based on the travel route information provided by the home server.

Preferably, in the step for calculating a travel route, the home server calculates the shortest travel route along which the autonomous mobile robot can reach the user.

Preferably, in the method for an autonomous mobile robot to travel along a travel route, in the step of sensing a user, if the user is sensed at a location where the cell coverage areas of adjacent beacons overlap, the resulting location information of the user is found along an X-axis and a Y-axis through an Equation of $(X_A+(X_B-X_A)/2, Y_B+(Y_B-Y_A)/2)$.

Preferably, the method for an autonomous mobile robot to travel along a travel route further includes re-transmitting, by the home server, the travel route information to the autonomous mobile robot, if travel routes are different when the travel route provided by the home server is compared with the current travel route along which the autonomous mobile robot reaches the user.

According to an aspect of the present invention, the beacons installed in the home sense the location information of the user and transmits the location information to the home server, and the home server calculates the shortest travel route along which the autonomous mobile robot can reach the user based on the location information provided by the home server, and provides the shortest travel route to the autonomous mobile robot, whereby the autonomous mobile robot may easily reach the user along the shortest travel route and thus reduce energy loss.

BRIEF DESCRIPTION OF THE DRAWINGS

The above and other objects, features and advantages of the present invention will become more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings. The same reference numbers are used throughout the drawings to refer to the same or like parts. Detailed descriptions of constructions or processes known in the art may be omitted to avoid obscuring the subject matter of the present invention.

Figure 3:
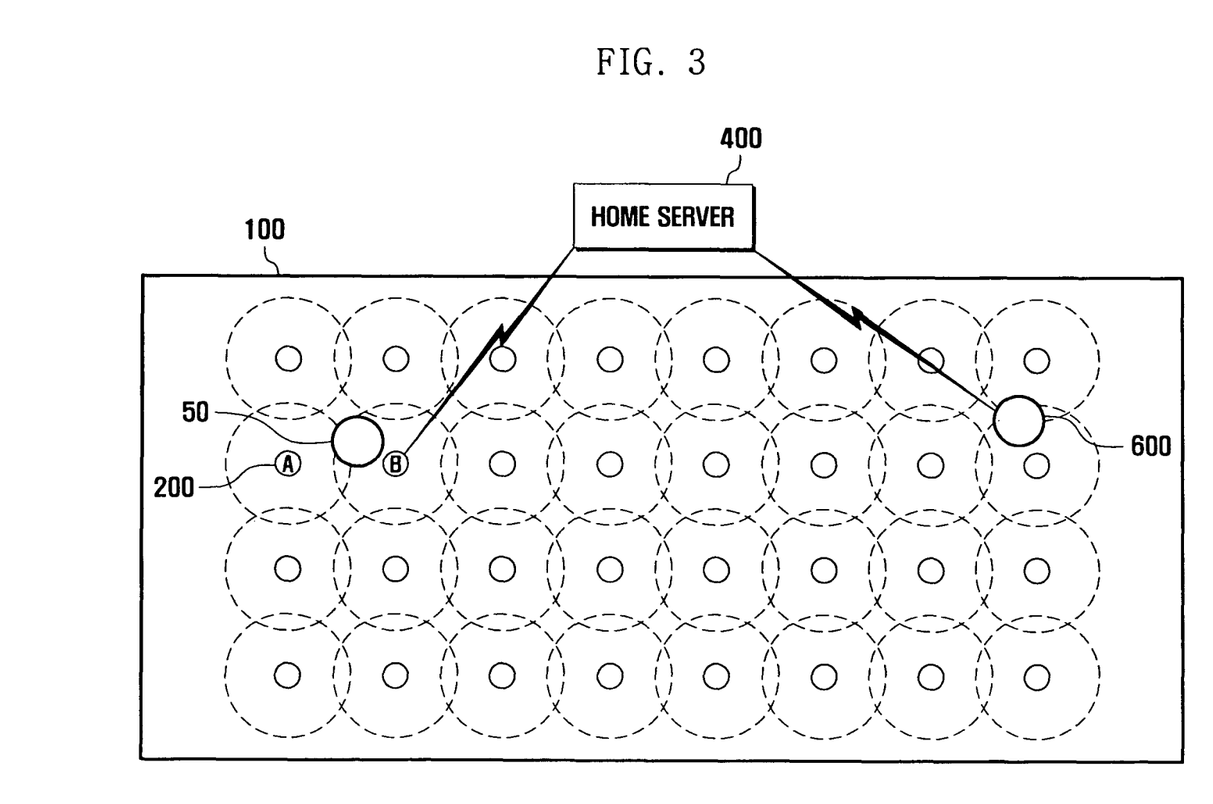
FIG. 3 is a diagram illustrating a home network system that enables an autonomous mobile robot to reach a user by traveling the shortest distance by finding the location of the user in accordance with an exemplary embodiment of the present invention.

FIG. 3 is a diagram illustrating a home network system that enables an autonomous mobile robot to reach a user by traveling the shortest distance by finding the location of the user in accordance with an exemplary embodiment of the present invention.

As illustrated in FIG. 3, a home network system includes beacons 200 installed in a home 100 at regular intervals, a home server 400 communicating with the beacons 200 to obtain location information of a user 50, and an autonomous mobile robot 600 receiving the location information of the user 50 and travel route information required to reach the user 50 from the home server 400.

The beacons 200 may be installed, for example, on a ceiling in the home 100, or may be mounted on electronic apparatuses installed in the home 100. Each of the beacons 200 has cell coverage. FIG. 3 shows most of the entire space in the home 100 is covered by the cell coverage area in accordance with an exemplary embodiment of the present invention.

The beacons 200 may sense movement of the user 50 located in a cell coverage area and transmit the result to the home server 400. In alternative embodiments, the beacons 200 may communicate with a communication apparatus of the user 50 located in the cell coverage area, obtain necessary information from the communication apparatus of the user 50, and transmit the information to the home server 400.

The home server 400 receives sensing information of the user 50, i.e., location information of the user 50, from the beacons 200 and calculates the travel route of the autonomous mobile robot 100 based on the information. For this purpose, the home server 400 stores map information of the home 100 and the location information of the beacons 200 installed in the home 100, and recognizes the location information of the autonomous mobile robot 600 through communication with the autonomous mobile robot 600. Preferably, when the home server 400 calculates the travel route along which the autonomous mobile robot 600 reaches the user 50 based on the location information of the user 50, the home server 400 calculates the travel route having the shortest travel distance. At this time, the home server 400 transmits information of the calculated travel route of the autonomous mobile robot 600 and the location information of the user 50 to the autonomous mobile robot 600.

Accordingly, the autonomous mobile robot 600 executes travel to reach the user 50, based on the location information of the user 50 and the travel route information (preferably, the shortest travel route information) for reaching the user 50, provided from the home server 400.

Therefore, the beacons 200 installed in the home 100 sense the location information of the user 50 and transmit the information to the home server 400, the home server 400 calculates the shortest travel route along which the autonomous mobile robot 600 reaches the user 50 based on the received location information, and provides the shortest travel route to the autonomous mobile robot 600, whereby the autonomous mobile robot 600 may easily reach the user 50 along the shortest travel route, and thereby reducing energy loss.

Figure 4:
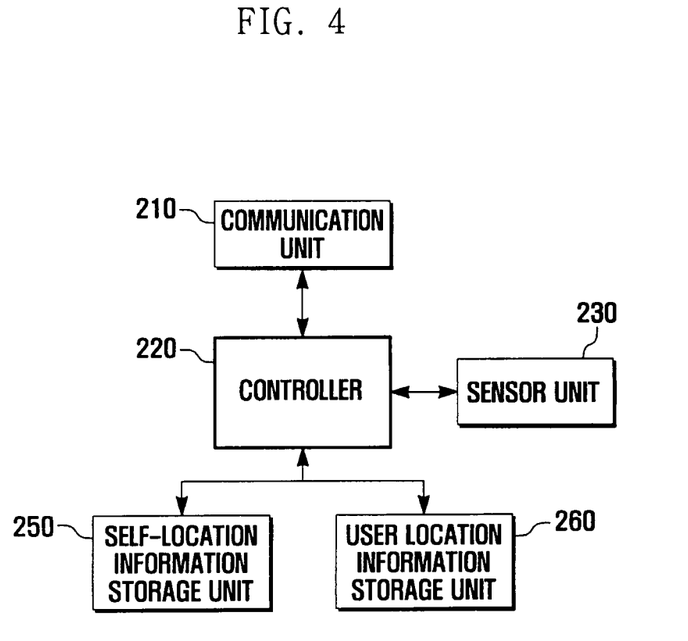
FIG. 4 is a block diagram illustrating a configuration of a beacon in the home network system of FIG. 3.

FIG. 4 is a block diagram illustrating a configuration of the beacon 200 of FIG. 3.

The beacon 200 includes a communication unit 210, a controller 220, a sensor unit 230, a self-location information storage unit 250, and a user location information storage unit 260.

The communication unit 210 executes local wire or wireless communication with the home server 400. Thereby, the communication unit 210 updates location information of its own location in the home server 400 and transmits location information of the user 50 to the home server 400.

The controller 220 controls the operation of the beacons 200, and controls to sense, and in some embodiments to communicate with, the user 50 and/or a communication apparatus of the user 50 located in the cell coverage area and to provide the result to the home server 400.

The sensor unit 230 senses the movement of the user 50 and/or the user's communication apparatus located in the cell coverage, and provides the sensed result to the controller 220. In the case where the sensed object is the user 50, the controller 220 transmits the sensing information of the user 50, i.e. the location information of the user 50, to the home server 400 through the communication unit 210. In the case where the sensed object is the communication apparatus of the user 50, the controller 220 executes communication with the communication apparatus of the user 50 through the communication unit 210, obtains the necessary information therefrom and transmits the resulting information to the home server 400.

The sensor unit 230 senses the communication apparatus of the user 50 through local wireless communication, such as Radio Frequency IDentification (RFID) or Zigbee. Information obtained from the sensed communication apparatus is RFID information of the communication apparatus. Accordingly, the controller 220 transmits the user information including the RFID information of the communication apparatus of the user 50 sensed by the sensor unit 230 to the home server 400 through the communication unit 210. In this case, the communication unit 210 executes RFID local wireless communication with the home server 400 using the RFID information assigned to a beacon 200. When the controller 220 transmits the RFID information of the communication apparatus of the user 50 to the home server 400, it is preferred that the controller 220 transmits the RFID information of the communication apparatus of the user including the RFID information assigned to the beacons 200.

In this exemplary embodiment, in the case where sensor unit 230 senses the RFID information of the communication apparatus of the user 50 and transmits the RFID information of the communication apparatus of the user 50 with the RFID information of the beacon 200 to the home server 400 through the RFID local wireless communication, the exemplary embodiment of the present invention can be incorporated without the self-location information storage unit 250 and the user location information storage unit 260. For this purpose, the home server 400 stores the location information of each of the beacons 200 corresponding to the assigned RFID information of each beacon 200. Thus, the home server 400 receives the RFID information of the beacon 200 and the RFID information of the communication apparatus of the user 50 transmitted from the corresponding beacon 200, finds the location of the beacon 200 through the RFID information of the beacon 200, and finds the location of the communication apparatus of the user 50 based on the information.

The self-location information storage unit 250 stores the location information of the beacon 200 in the map information of the home 100. The user location information storage unit 260 stores the location information of the user 50 obtained when the sensor unit 230 senses the user 50.

The beacon 200 may also output a beacon signal so that the autonomous mobile robot 600 may find the location of the corresponding beacon 200.

Figure 5:
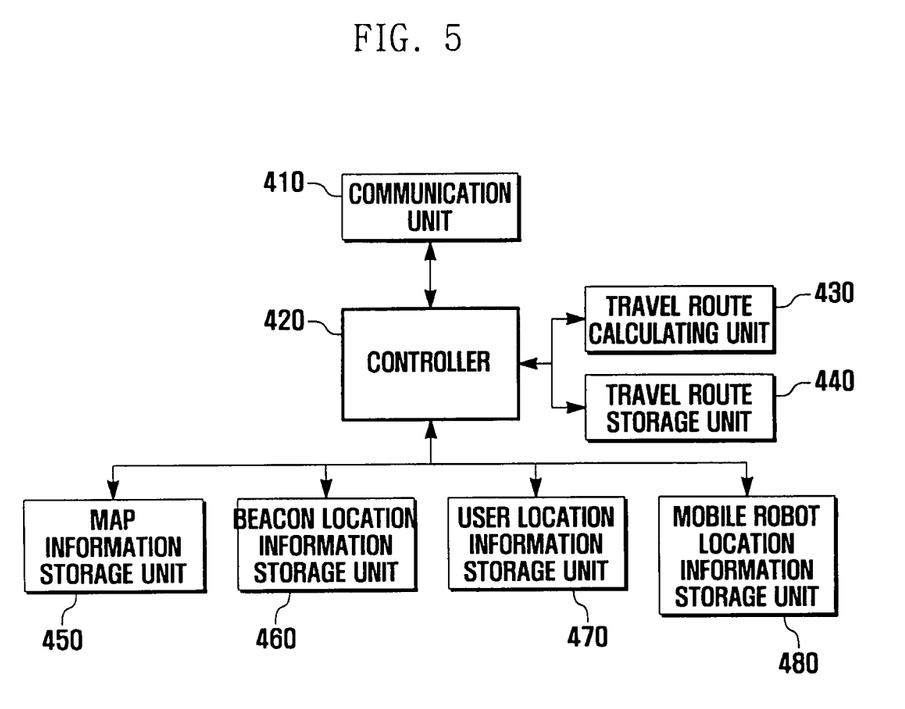
FIG. 5 is a block diagram illustrating a configuration of a home server in the home network system of FIG. 3.

FIG. 5 is a block diagram illustrating a configuration of the home server 400 of FIG. 3.

The home server 400 includes a communication unit 410, a controller 420, a travel route calculating unit 430, a travel route storage unit 440, a map information storage unit 450, a beacon location information storage unit 460, a user location information storage unit 470, and a mobile robot location information storage unit 480.

The communication unit 410 executes communication with the beacons 200 installed in the home 100 and the autonomous mobile robot 600. In this exemplary embodiment of the present invention, the communication unit 410 receives the location information of the user 50 from the beacons 200, and transmits the location information of the user 50 and the travel route information to the autonomous mobile robot 600.

The controller 420 controls the operation of the home server 400, and controls to calculate the shortest travel route of the autonomous mobile robot 600 based on the location information of the user 50 provided from the beacons 200, and to transmit the result to the autonomous mobile robot 600.

The travel route calculating unit 430 calculates the shortest travel route, along which the autonomous mobile robot 600 reaches the user 50, based on the location information of the user 50 provided from the beacons 200. The travel route storage unit 440 stores the shortest travel route of the autonomous mobile robot 600 calculated by the travel route calculating unit 430.

The map information storage unit 450 stores the map information of the home 100, and the beacon location information storage unit 460 stores the location information of the beacons 200 installed in the home 100. The beacon location information storage unit 460 may additionally store RFID information assigned to the beacons 200 corresponding to the location information.

The user location information storage unit 470 stores the location information of the user 50 provided from the beacon 200, and the mobile robot location information storage unit 480 stores the location information of the autonomous mobile robot 600 obtained through communication with the autonomous mobile robot 600. The user location information storage unit 470 may additionally store the user information including the RFID information of the communication apparatus of the user 50.

Figure 6:
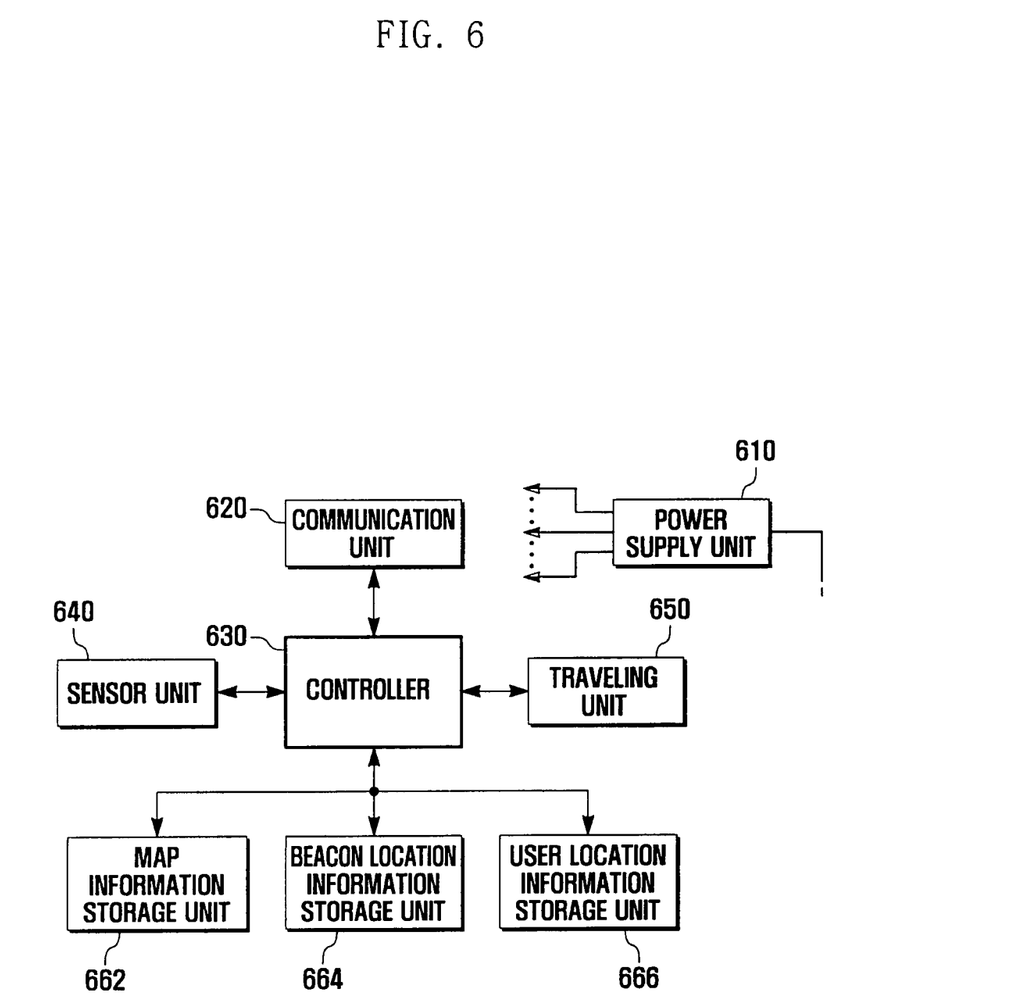
FIG. 6 is a block diagram illustrating a configuration of the autonomous mobile robot in the home network system of FIG. 3.

FIG. 6 is a block diagram illustrating a configuration of the autonomous mobile robot 600.

The autonomous mobile robot 600 includes a power supply unit 610, a communication unit 620, a controller 630, a sensor unit 640, a traveling unit 650, a map information storage unit 662, a beacon location information storage unit 664, and a user location information storage unit 666.

The power supply unit 610 provides power required for operation of the autonomous mobile robot 600 and supplies power to each unit. The communication unit 620 executes communication with the home server 400, receives the location information of the user 50 and the travel route information of the autonomous mobile robot 600 from the home server 400, and transmits the location information of the autonomous mobile robot 600 to the home server 400.

The controller 630 controls the operation of the autonomous mobile robot 600, and controls the movement of the autonomous mobile robot 600 based on the travel route information received from the home server 400.

The sensor unit 640 senses the location of the autonomous mobile robot 600 and of obstacles in the home 100. The sensor unit 640 receives beacon signals output from the beacons 200 and provides the beacon signals to the controller 630, and the controller 630 finds the location of the autonomous mobile robot 600 according to the intensity of received beacon signals. Also, when the controller 630 receives information regarding sensed obstacles from the sensor unit 640, the controller 630 controls the traveling unit 650 to control the travel direction of the autonomous mobile robot 600.

The traveling unit 650 executes a movement operation according to control of the controller 630 so that the autonomous mobile robot 600 reaches a destination, i.e. the user 50.

The map information storage unit 662 stores the map information of the home 100, and the beacon location information storage unit 664 stores the location information of the beacons 200 installed in the home 100. The user location information storage unit 666 stores the location information of the user 50 provided from the home server 400.

Figure 7:
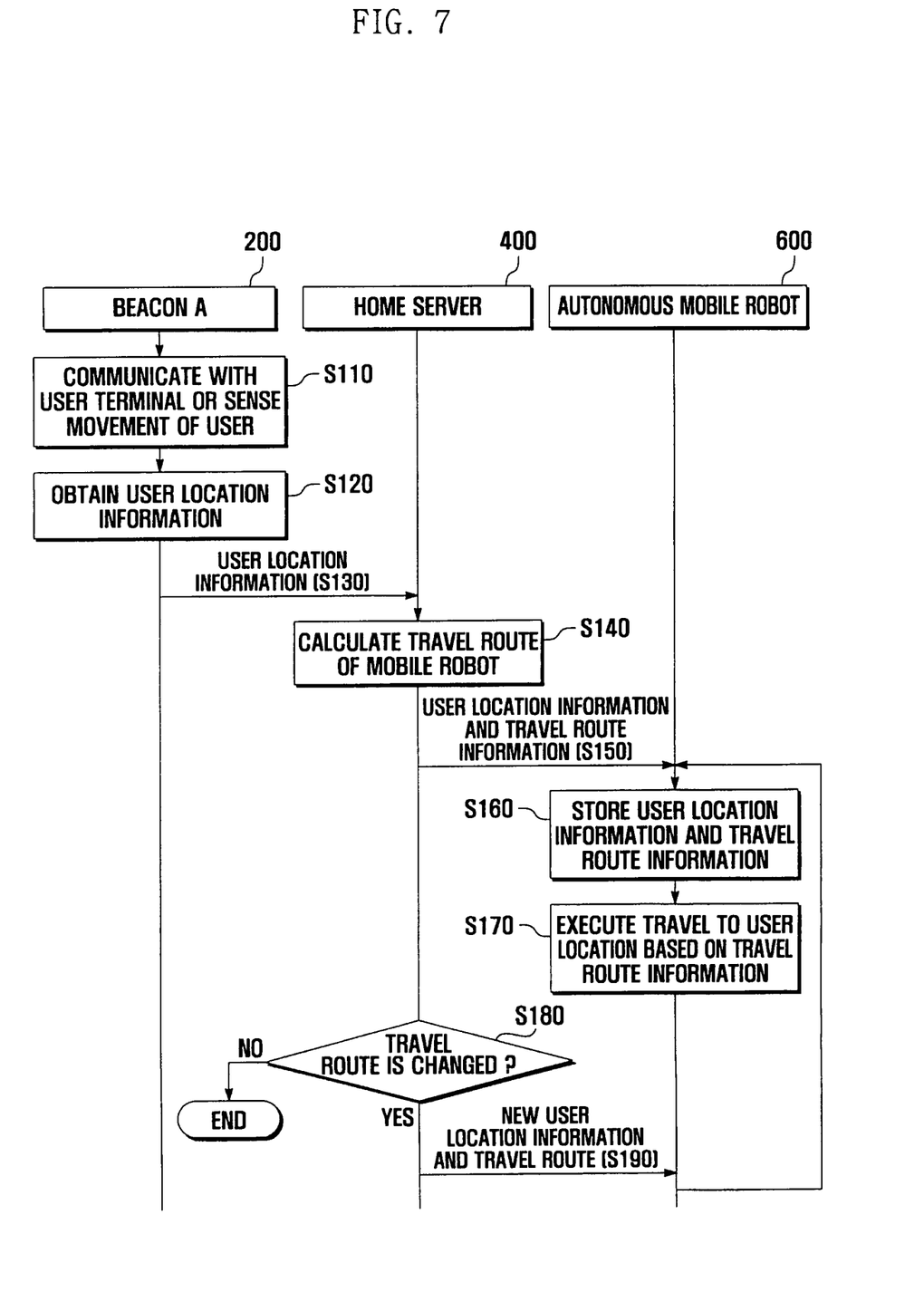
FIG. 7 is a flowchart illustrating a method for an autonomous mobile robot to travel along a travel route in a home network system in accordance with an exemplary embodiment of the present invention.

FIG. 7 is a flowchart illustrating a method for an autonomous mobile robot 600 to travel along a travel route in a home network system in accordance with an exemplary embodiment of the present invention.

As illustrated in FIG. 7, a beacon 200 communicates with a communication apparatus of a user located in the cell coverage of the beacon 200 or senses the movement of the user in step S110, and thereby obtains location information of the user in step S120. In step S130, the beacon 200 transmits the obtained location information of the user to a home server 400.

If the location of the user is sensed at a location where the cell coverage areas of two adjacent beacons 200 overlap, each of the beacons 200 (referred to here as A and B) transmits the location information of the user sensed by each of the beacons A and B to the home server 400.

The travel route calculating unit 430 of the home server 400 calculates the location information of the user by the following Equation (1) below, and thus calculates the shortest travel route of the autonomous mobile robot 600.

$$\text{Location of user} = (X_A + (X_B - X_A)/2, Y_A + (Y_B - Y_A)/2) \quad [1]$$

The $X_A$ and $Y_A$ are coordinates of beacon A and $X_B$ and $Y_B$ are coordinates of beacon B.

The home server 400 calculates the shortest travel route of the autonomous mobile robot 600 based on the location information of the user transmitted from the beacons 200 in step S140. In step S150, the home server 400 transmits the location information of the user and the calculated shortest travel route information to the autonomous mobile robot 600.

The autonomous mobile robot 600 stores the location information of the user and the shortest travel route information transmitted from the home server 400 in step S160, and executes travel to reach the location of the user based on the shortest travel route information in step S170.

Accordingly, the autonomous mobile robot 600 may reach the user effectively based on the shortest travel route information provided from the home server 400.

Meanwhile, if the user is sensed by another beacon other than the beacon 200, thereby indicating that the location of the user has changed and that the travel route of the autonomous mobile robot 600 is changed in step S180, the home server 400 processes and transmits new location information and new travel route information corresponding to the user to the autonomous mobile robot 600 in step S190. Subsequently, the autonomous mobile robot 600 performs the steps of S160 and S170.

According to the present invention, beacons installed in a home sense location information of a user and transmit the location information to a home server, and the home server calculates the shortest travel route along which an autonomous mobile robot can reach the user based on the received location information, and provides the shortest travel route to the autonomous mobile robot. The autonomous mobile robot may thereby easily reach the user along the shortest travel route, and reducing energy loss.

While exemplary embodiments of the present invention have been described in detail herein above, it should be understood that many variations and modifications of the basic inventive concept herein described, which may appear to those skilled in the art, will still fall within the spirit and scope of the exemplary embodiments of the present invention as defined in the appended claims.

What is claimed is:

1. A home network system capable of home automation, the home network system comprising:
   a plurality of beacons uniformly arranged at regular intervals over an entire area of a home for obtaining information of a user located in a respective cell coverage area of a corresponding beacon by sensing at least one communication apparatus of the user, the information of the user comprising Radio Frequency Identification (RFID) information of the at least one communication apparatus of the user and for transmitting information of the user obtained from the at least one communication apparatus of the user to a home server;
   the home server for receiving the sensing information of the user transmitted from the plurality of beacons, for receiving location information of an autonomous mobile robot, for calculating a travel route along which the autonomous mobile robot can reach the user based on the received sensing information and the received location information of the autonomous mobile robot, and for transmitting the calculated travel route to the autonomous mobile robot via wireless communication; and
   the autonomous mobile robot, which is separate from both home server and the plurality of beacons, for receiving the transmitted travel route information, and executing travel to reach the user based on received travel route information,
   wherein, if the users is sensed at a location where the cell coverage areas of adjacent beacons overlap, the location information of the user is defined as corresponding to a location centered between the adjacent beacons, and
   wherein, sensing the user includes, if the user is sensed at the location where the cell coverage areas of adjacent beacons overlap, the resulting location information of the user is found along an X-axis and a Y-axis through $(X_A+(X_B-X_A)/2, Y_A+(Y_B-Y_A)/2)$, where $(X_A, YA)$ is a co-ordinate of one of the adjacent beacons and $(XB, Y_A)$ is a co-ordinate of another one of the adjacent beacons.

2. The home network system of claim 1, wherein each of the plurality of beacons includes:
   a sensor unit for sensing the user or a communication apparatus of the user located within the cell coverage area of the beacon;
   a communication unit for transmitting the sensing information of the user to the home server; and
   a controller for controlling the communication unit to execute communication with the communication apparatus sensed by the sensor unit and to transmit information of the user to the home server.

3. The home network system of claim 2, wherein each of the plurality of beacons further includes:
   a first storage unit for storing location information of the beacon; and
   a second storage unit for storing location information of the user sensed by the sensor unit.

4. The home network system of claim 2, wherein the beacons have assigned RFID information and the home server stores location information corresponding to the RFID information assigned to the beacons.

5. The home network system of claim 1, wherein the beacons are attached to electronic apparatuses in the home.

6. The home network system of claim 1, wherein the home server includes:
   a communication unit for obtaining location information of the user through communication with the beacons and transmitting the travel route to the autonomous mobile robot via the wireless communication;
   a travel route calculating unit for calculating the travel route along which the autonomous mobile robot reaches the user based on the location information of the user; and
   a controller for controlling transmission of the calculated travel route to the autonomous mobile robot through the communication unit.

7. The home network system of claim 6, wherein the travel route calculating unit calculates a shortest travel route along which the autonomous mobile robot reaches the user.

8. The home network system of claim 6, wherein the home server further includes a travel route storage unit for storing the travel route calculated by the travel route calculating unit.

9. The home network system of claim 6, wherein the home server further includes:
- a map information storage unit for storing map information of the home;
- a beacon location information storage unit for storing location information of the beacons installed in the home;
- a user location information storage unit for storing location information of the user transmitted from the beacons; and
- a mobile robot location information storage unit for storing location information of the autonomous mobile robot.

10. The home network system of claim 1, wherein the autonomous mobile robot includes:
- a power supply unit for providing power for the autonomous mobile robot to move independently;
- a communication unit for executing the wireless communication with the home server to receive the travel route;
- a traveling unit for executing travel based on the travel route;
- a sensor unit for sensing obstacles during travel of the traveling unit; and
- a controller for controlling travel of the traveling unit based on the travel route, and if obstacles are sensed by the sensor unit, for controlling the traveling unit to avoid the obstacles and reach the user.

11. The home network system of claim 10, wherein the autonomous mobile robot further comprises:
- a map information storage unit for storing map information of the home;
- a beacon location information storage unit for storing location information of the beacons installed in the home;
- a user location information storage unit for storing location information of the user transmitted from the home server; and
- a travel route storage unit for storing the travel route transmitted from the home server.

12. A method for an autonomous mobile robot to travel along a travel route using a home network system including beacons, a home server, and the autonomous mobile robot, which is separate from both the home server and the beacons, the method comprising:
- obtaining, by the beacons, information of a user located in a respective cell coverage area of a corresponding beacon by sensing at least one communication apparatus of the user, the information of the user comprising Radio Frequency Identification (RFID) information of the at least one communication apparatus of the user and transmitting the information of the user obtained from the at least one communication apparatus of the user to the home server;
- receiving, by the home server, the transmitted sensing information of the user from the beacons and receiving location information of the autonomous mobile robot transmitted from the autonomous mobile robot;
- calculating, by the home server, a travel route along which the autonomous mobile robot can reach the user based on the sensing information of the user transmitted from the beacons and the location information of the autonomous mobile robot, and transmitting the travel route to the autonomous mobile robot via wireless communication; and
- executing, by the autonomous mobile robot, travel to reach the user based on travel route information provided by the home server,
- wherein the beacons are uniformly arranged at regular intervals over an entire area of a home, and
- wherein, if the users is sensed at a location where the cell coverage areas of adjacent beacons overlap, the location information of the user is defined as corresponding to a location centered between the adjacent beacons, and wherein, sensing the user includes, if the user is sensed at the location where the cell coverage areas of adjacent beacons overlap, the resulting location information of the user is found along an X-axis and a Y-axis through $(X_A+(X_B-X_A)/2, Y_A+(Y_B-Y_A)/2)$, where $(X_A, YA)$ is a co-ordinate of one of the adjacent beacons and $(XB, Y_A)$ is a co-ordinate of another one of the adjacent beacons.

13. The method for an autonomous mobile robot to travel along a travel route of claim 12, wherein in calculating the travel route, the home server calculates the shortest travel route along which the autonomous mobile robot reaches the user.

14. The method for an autonomous mobile robot to travel along a travel route of claim 13, further comprising:
- when the travel route transmitted to the autonomous mobile robot by the home server is compared with current travel route along which the autonomous mobile robot reaches the user, if the travel routes are different,
- re-transmitting, by the home server, the current travel route information to the autonomous mobile robot via wireless communication.

* * * * *